United States Patent
Zindler

(10) Patent No.: US 10,272,003 B2
(45) Date of Patent: Apr. 30, 2019

(54) REAR ENTRY LATCH ASSEMBLY

(71) Applicant: The Braun Corporation, Winamac, IN (US)

(72) Inventor: Michael T. Zindler, Kalamazoo, MI (US)

(73) Assignee: THE BRAUN CORPORATION, Winamac, IN (US)

( * ) Notice: Subject to any disclaimer, the term of this patent is extended or adjusted under 35 U.S.C. 154(b) by 0 days.

(21) Appl. No.: 15/665,680

(22) Filed: Aug. 1, 2017

(65) Prior Publication Data
US 2018/0038139 A1 Feb. 8, 2018

Related U.S. Application Data

(60) Provisional application No. 62/371,903, filed on Aug. 8, 2016.

(51) Int. Cl.
| | |
|---|---|
| *A61G 3/06* | (2006.01) |
| *E05B 81/20* | (2014.01) |
| *B62D 25/12* | (2006.01) |
| *B62D 33/027* | (2006.01) |
| *E05B 83/18* | (2014.01) |
| *E05B 79/10* | (2014.01) |
| *E05B 83/20* | (2014.01) |
| *B62D 33/037* | (2006.01) |
| *E05B 79/20* | (2014.01) |

(Continued)

(52) U.S. Cl.
CPC ............ *A61G 3/061* (2013.01); *B62D 25/12* (2013.01); *B62D 33/027* (2013.01); *B62D 33/037* (2013.01); *E05B 79/10* (2013.01); *E05B 79/20* (2013.01); *E05B 81/20* (2013.01); *E05B 83/18* (2013.01); *E05B 83/20* (2013.01); *B60P 1/43* (2013.01); *E05B 63/143* (2013.01); *E06B 7/28* (2013.01)

(58) Field of Classification Search
CPC ..... Y10T 292/1082; A61G 3/061; B60P 1/43; E05B 83/20; B62D 33/037
USPC ............ 296/61, 57.1; 340/5.72; 292/DIG. 29
See application file for complete search history.

(56) References Cited

U.S. PATENT DOCUMENTS

| | | | |
|---|---|---|---|
| 8,109,553 B2 * | 2/2012 | Zielinsky | E05F 1/1215 296/106 |
| 9,212,509 B2 | 12/2015 | Pettengill et al. | |

(Continued)

OTHER PUBLICATIONS

AU9474438, Dated May 1995 Kite (Year: 1995).*

*Primary Examiner* — Dennis H Pedder
(74) *Attorney, Agent, or Firm* — Taft Stettinius & Hollister LLP; Stephen F. Rost

(57) ABSTRACT

A motor vehicle having a body, for transporting a wheelchair-confined passenger, and a rear liftgate, for providing ingress and egress for the passenger. The motor vehicle includes a tailgate frame operatively connected to the body and disposed adjacently to the rear liftgate. The tailgate frame defines an opening. A tailgate is movably coupled to the tailgate frame at the opening, wherein the tailgate includes a closed position and an open position. A latch is operatively connected to the tailgate. The latch includes a latched condition configured to latch the tailgate in the closed position, a lock condition configured to lock the tailgate in the closed position, and an unlatched condition configured to unlatch the tailgate for movement from the closed position to the open position.

19 Claims, 10 Drawing Sheets

(51) Int. Cl.
  *E06B 7/28* (2006.01)
  *B60P 1/43* (2006.01)
  *E05B 63/14* (2006.01)

(56) References Cited

U.S. PATENT DOCUMENTS

| | | | |
|---|---|---|---|
| 2004/0118666 A1* | 6/2004 | McCaig | H01H 3/163 200/38 F |
| 2005/0179269 A1* | 8/2005 | Weiland | B60J 5/105 293/149 |
| 2007/0262603 A1* | 11/2007 | Robertson | B60R 25/1001 296/57.1 |
| 2014/0284939 A1* | 9/2014 | Wittelsbuerger | E05B 77/06 292/92 |

* cited by examiner

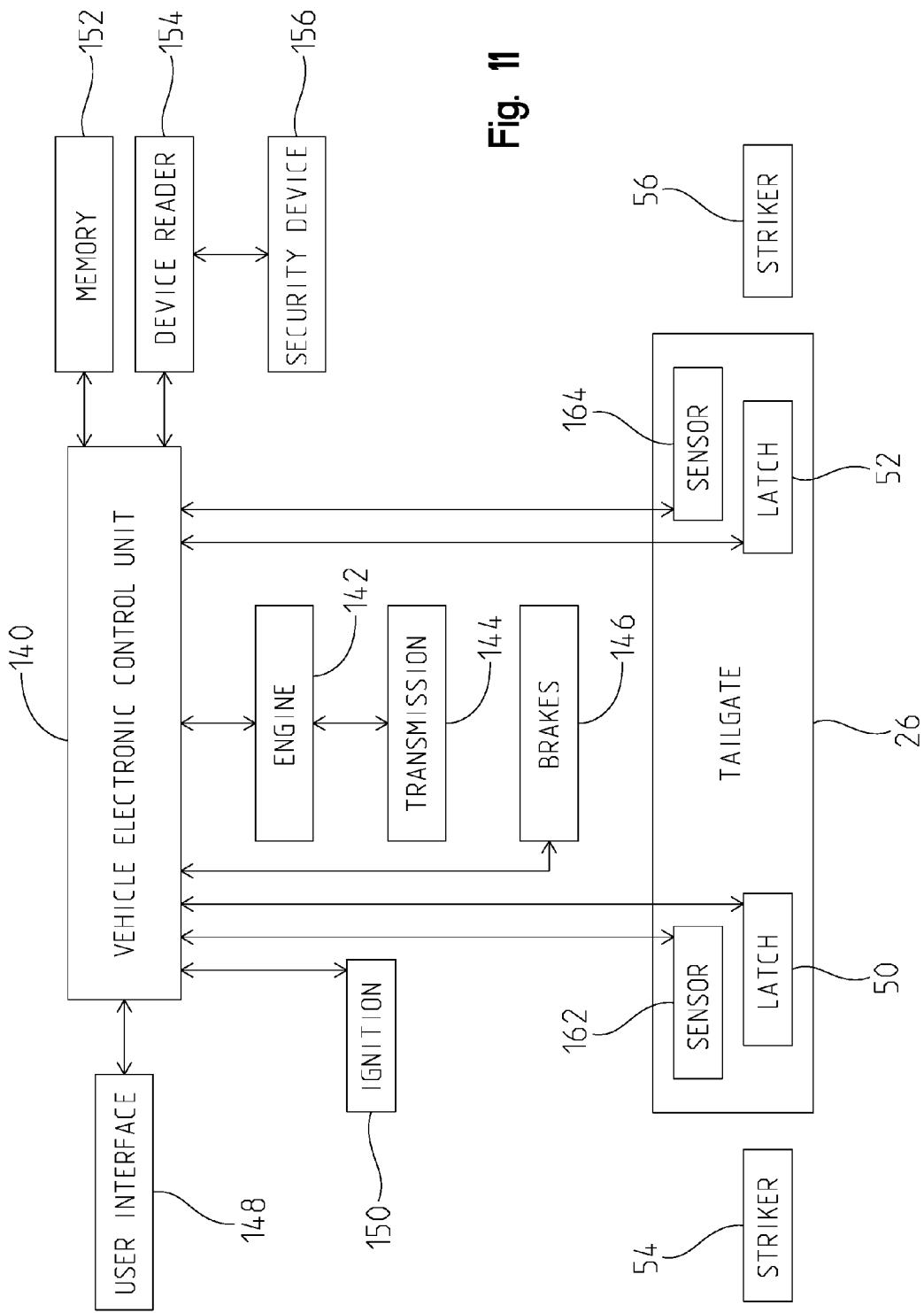

REAR ENTRY LATCH ASSEMBLY

RELATED APPLICATION

This application claims priority to US. Patent Application Ser. No. 62/371,903, filed Aug. 8, 2016, having the title "Rear Entry Latch Assembly", which is hereby incorporated by reference in its entirety.

FIELD

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example in one configuration, a van is retrofitted with a ramp to enable a physically limited individual using a wheelchair to enter and exit the vehicle without the assistance of another individual.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry and exit of the physically limited individual through what is known as the assisted entrance. Once inside the van, individual who uses the assisted entrance is located in a rear passenger compartment of the van adjacent to or behind the assisted entrance.

In one known retrofitted van, an OEM van is modified to include a ramp assembly to provide a wheelchair confined individual with access to an interior of the vehicle through the rear lift gate. The "rear-entry van" is modified to include an inclined floor which is extended to the pavement by a ramp. In some vehicles, which are considered as viable candidates for retrofitting, the construction of the OEM vehicle requires significant modification to accommodate the addition of a ramp. Not only must a subfloor be added, but the rear entry opening needs to be modified to provide access to the wheelchair. Consequently, what is needed is a modification to an OEM vehicle which provides access to individuals confined to a wheelchair or other mobility alternatives to wheelchairs.

SUMMARY

In one embodiment, there is provided a motor vehicle for transporting a wheelchair-confined passenger. The motor vehicle includes a body, a tailgate frame operatively connected to the body, wherein the tailgate frame defines an opening. A tailgate is movably coupled to one of the body and the tailgate frame, wherein the tailgate includes a closed position adapted to prevent ingress and egress of the wheelchair-confined passenger through the opening and an open position adapted to enable ingress and egress of the wheelchair-confined passenger through the opening. A latch is operatively connected to the tailgate, wherein the latch includes a latched position configured to latch the tailgate in the closed position and an unlatched position configured to unlatch the tailgate for movement from the closed position to the open position.

In another embodiment, there is provided a motor vehicle having a body for transporting a wheelchair-confined passenger. The motor vehicle includes a rear liftgate and a tailgate frame operatively connected to the body and disposed adjacently to the rear liftgate, the tailgate frame defining an opening. A tailgate is movably coupled to the tailgate frame at the opening, wherein the tailgate includes a closed position and an open position. A latch is operatively connected to the tailgate, wherein the latch includes a latched position configured to latch the tailgate in the closed position and an unlatched position configured to unlatch the tailgate for movement from the closed position to the open position.

In an additional embodiment, there is provided a motor vehicle having a body for transporting a wheelchair-confined passenger wherein the motor vehicle includes a rear liftgate including a liftgate latch. The motor vehicle includes a tailgate frame operatively connected to the body and disposed adjacently to the rear liftgate and which includes an opening. A tailgate is movably coupled to the tailgate frame at the opening, wherein the tailgate includes a closed position and an open position. A tailgate striker is operatively connected to the tailgate and is striker is configured to engage the liftgate latch, wherein the tailgate striker in an unlatched condition enables movement of the tailgate to the open position.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 11 illustrates a schematic block diagram of a vehicle and a vehicle control system.

DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
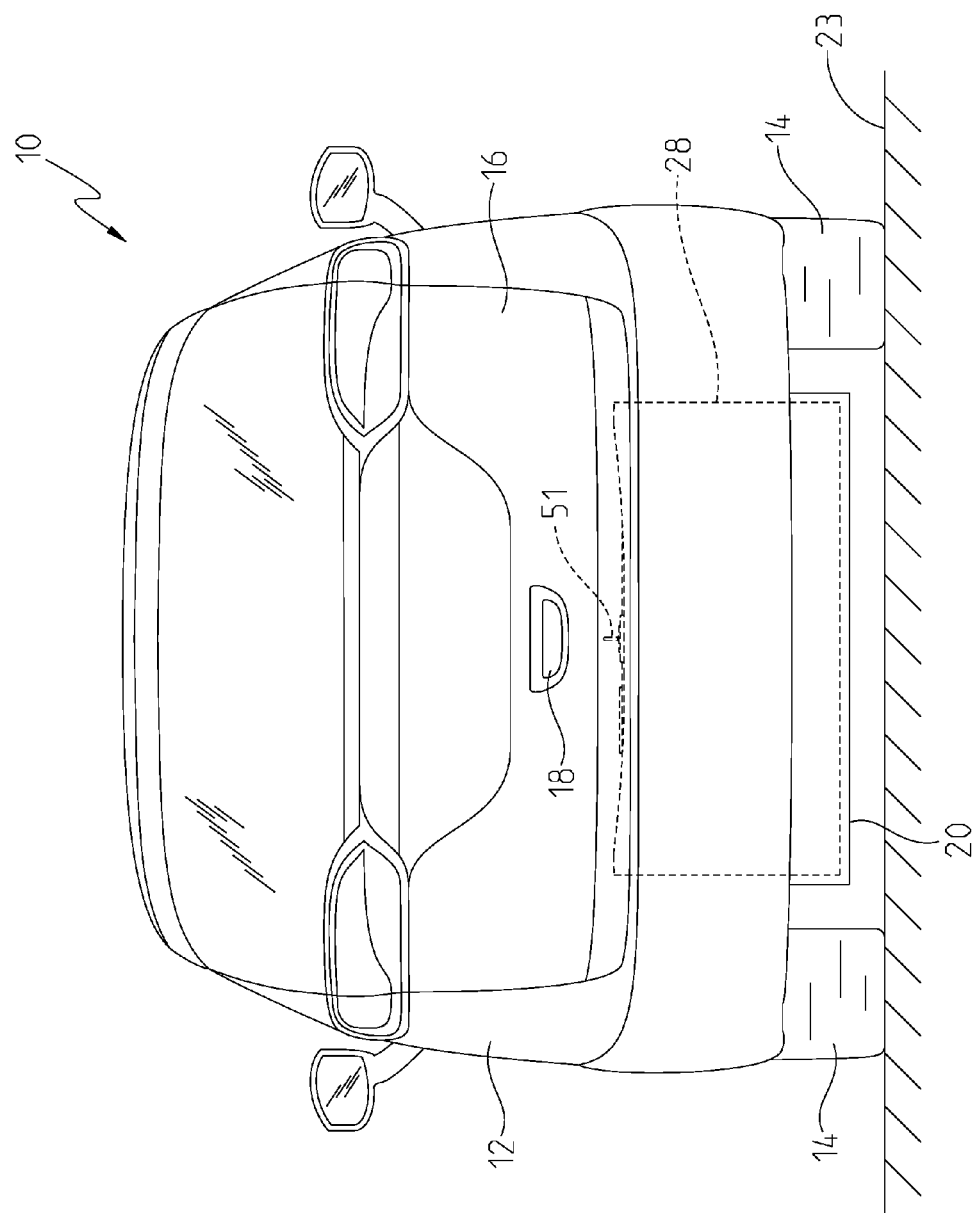
FIG. 1 illustrates an elevational view of a passenger vehicle including a tailgate located next to a rear liftgate.

FIG. 1 illustrates a vehicle 10, commonly identified as a passenger van, available from any number of United States and foreign manufacturers. In the illustrated embodiment, the vehicle 10 includes a unibody construction, but other vehicles having a frame on body construction are also included in the present disclosure. Consequently the use of vehicle herein includes all types and kinds of vehicles with a body on frame construction, a unibody construction, or other constructions. In addition, while the passenger van 10 is illustrated in FIG. 1, the present disclosure is directed to all passenger vehicles carrying one or more passengers.

The vehicle 10 includes a body 12 operatively coupled to front wheels (not shown) and rear wheels 14. One or more side doors are located between the front wheels and rear wheels 14 and provide access to an individual for entering and exiting the vehicle 10.

Figure 2:
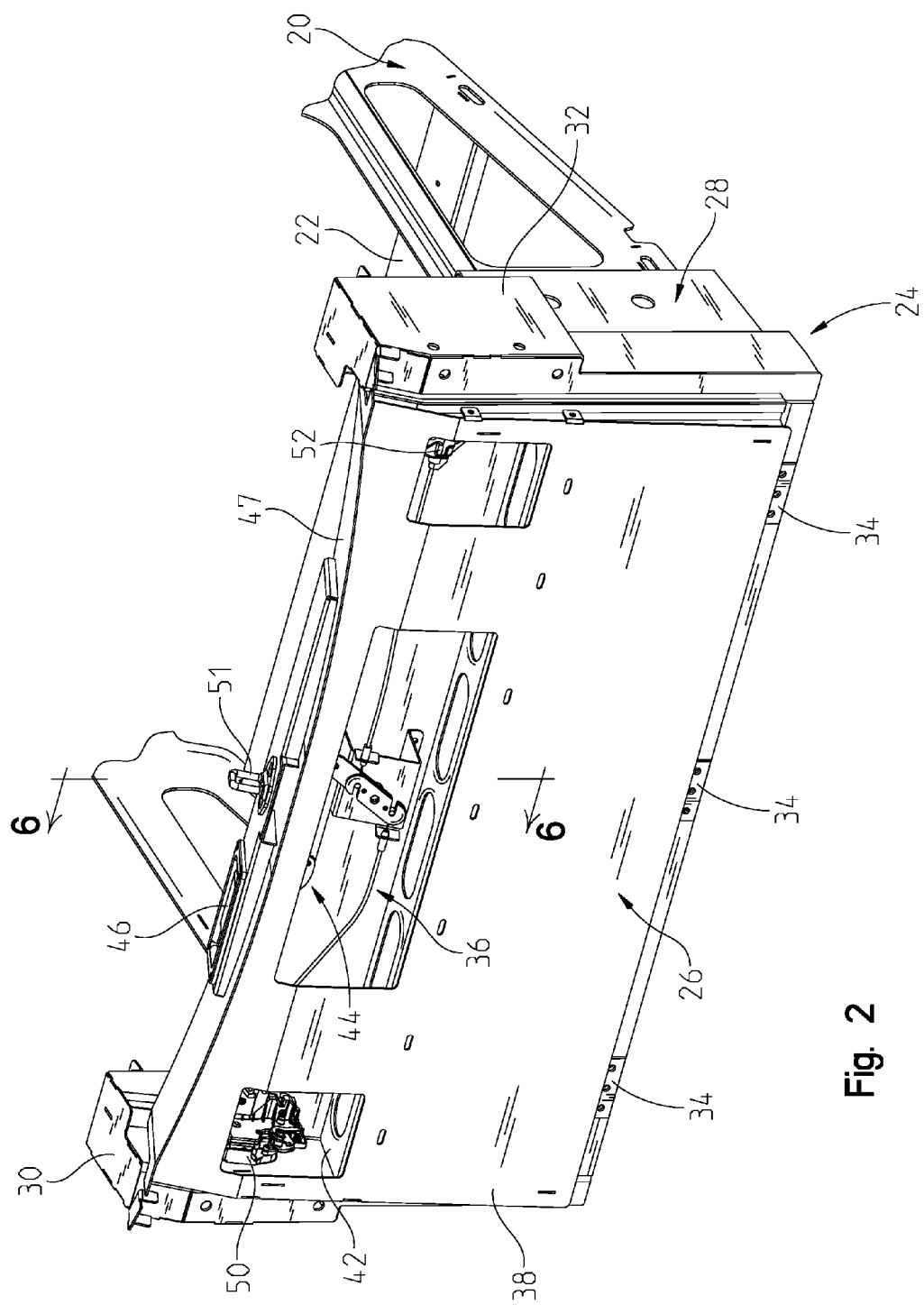
FIG. 2 illustrates a perspective view of a tailgate coupled to a tail gate support frame with the tailgate in a closed position.

The vehicle 10 includes a liftgate 16 movably coupled to the unibody frame through one or more hinges, as is known by those skilled in the art. The liftgate 16 includes an exterior door handle 18 which provides for opening of the liftgate 16 to provide access to and exit from the vehicle 10. In the modified OEM vehicle 10 of FIG. 1, a floor of the van is replaced with a ramp assembly 20 which lowers at least part of the floor. The ramp assembly 20 provides an inclined support 22, as seen in FIG. 2. A movable ramp located at an end of the inclined support 22 enables a wheelchaired individual to move along the ramp from pavement 23 and into the interior of the vehicle.

The vehicle 10 includes a tailgate support assembly 24, shown in FIG. 2, which includes a tailgate 26. The tailgate 26 is located within the interior of the vehicle 10 and is partially adjacent to the liftgate 16. This location of the tailgate 26 is shown by dotted outline 28 in FIG. 1.

As illustrated in FIG. 2, the tailgate support assembly 24 includes a tailgate support frame 28 having a first side 30 and a second side 32. Each of the first side 30 and the second side 32 are located at the end of the ramp assembly 20. In one embodiment, the ramp assembly 20 forms some or all of the tailgate support assembly 24. In another embodiment, the ramp assembly 20 is a separate assembly from the tailgate support assembly 24.

The tailgate 26 is rotatably coupled to the to the tailgate support frame 28 with a plurality of hinges 34. The hinges enable the tailgate 26 to be moved from a closed position of FIG. 2, to a partially open position of FIG. 3, and to a completely open position. In another embodiment, the tailgate 26 is rotatably coupled to the frame of the vehicle 10.

A release mechanism 36 is located in an interior portion of the tailgate 26, which includes a front panel 38 and a rear panel 40 which are spaced apart to define the interior area of the tailgate. The tailgate 26 includes one or more supports 42 arranged in the interior to provide a stable structure for the tailgate. The release mechanism 36 is operatively connected to an actuation mechanism 44 which adjusts the position of the release mechanism 36 with a handle 46. The handle 46 is located in a top portion 47 of the tailgate 26 and is accessible by an individual for releasing the tailgate 26 from the latched or locked position of FIG. 2. Upon movement of the handle to release the tailgate 26, a first latch 50 and a second latch 52 (see FIG. 4) are moved to an unlatched position by the release mechanism 36. In another embodiment, a pushbutton is used instead of a handle, and a motor is coupled to the pushbutton to release the tailgate.

Figure 3:
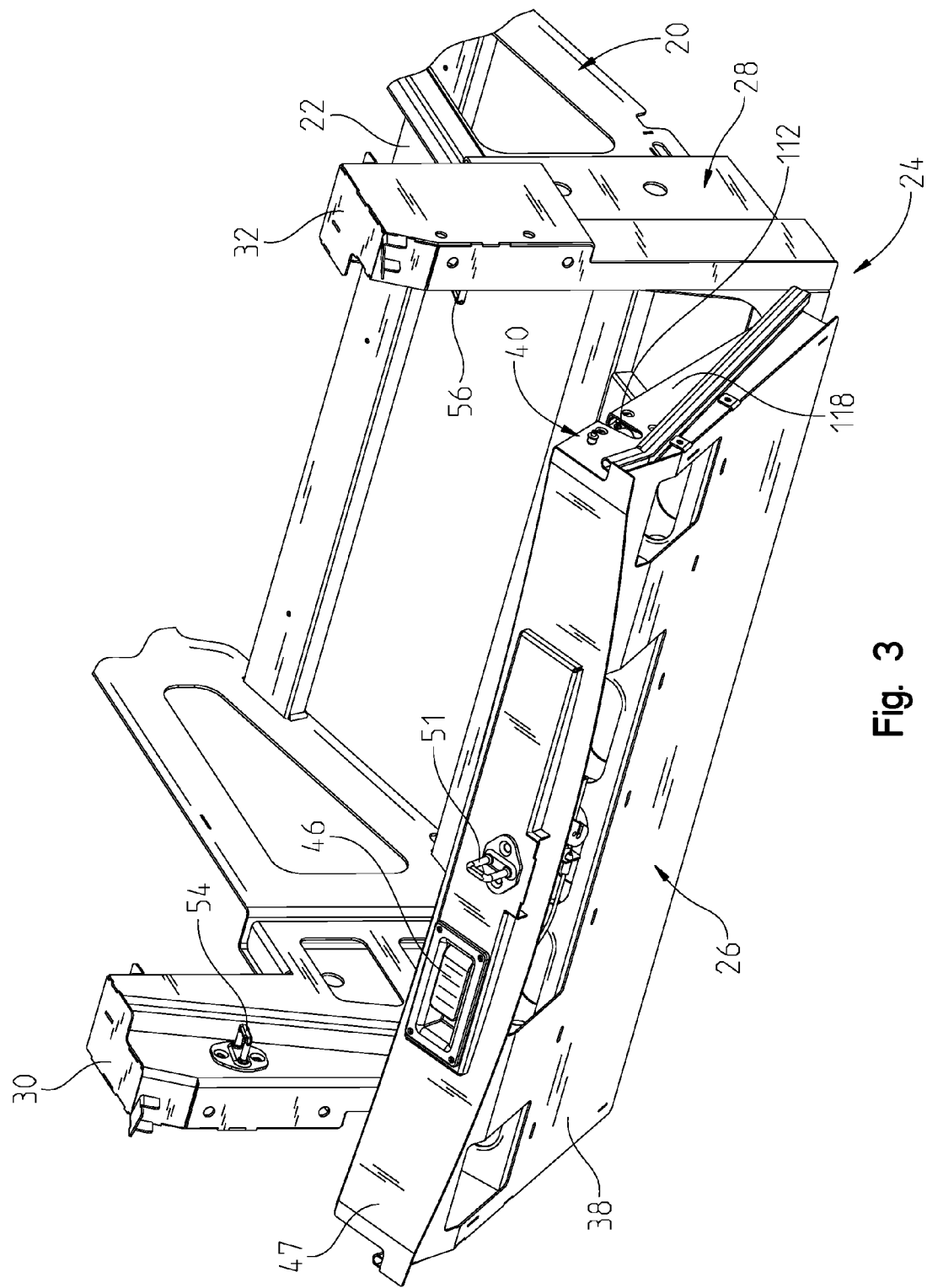
FIG. 3 illustrates a perspective view of a tailgate coupled to a tailgate support frame with the tailgate in a partially open position.

As shown in FIG. 3, the tailgate 26 is in a partially open condition. To open the tailgate 26, the liftgate 16 must first be opened by use of the handle 18 which disengages a liftgate latch (not shown) from a striker 51 which is fixedly coupled to the top portion 47 of the tailgate 26. Once the liftgate 16 is released from the striker 51 and is opened, each of the first and second latches 50 and 52 are released from engaging a first striker 54 and second striker 56 by use of the handle 46 to open the tailgate 26. Each of the strikers 54 and 56 are fixedly and respectively coupled to the first side 30 and the second side 32 and provide a secure closed position of the tailgate 26 with the tailgate support frame 28.

Figure 4:
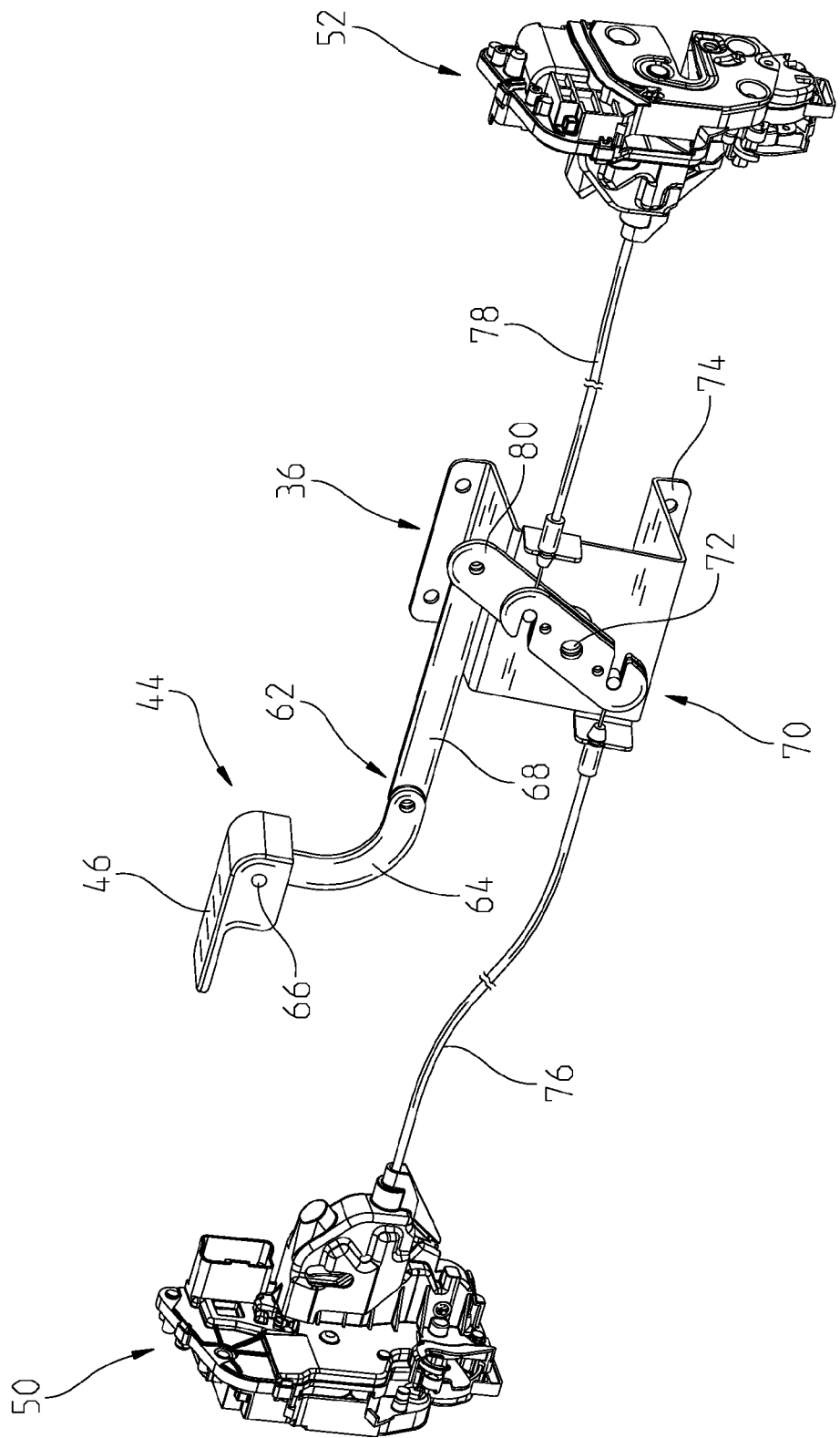
FIG. 4 illustrates a perspective view of a release mechanism coupled to a first and a second latch.
Figure 5:
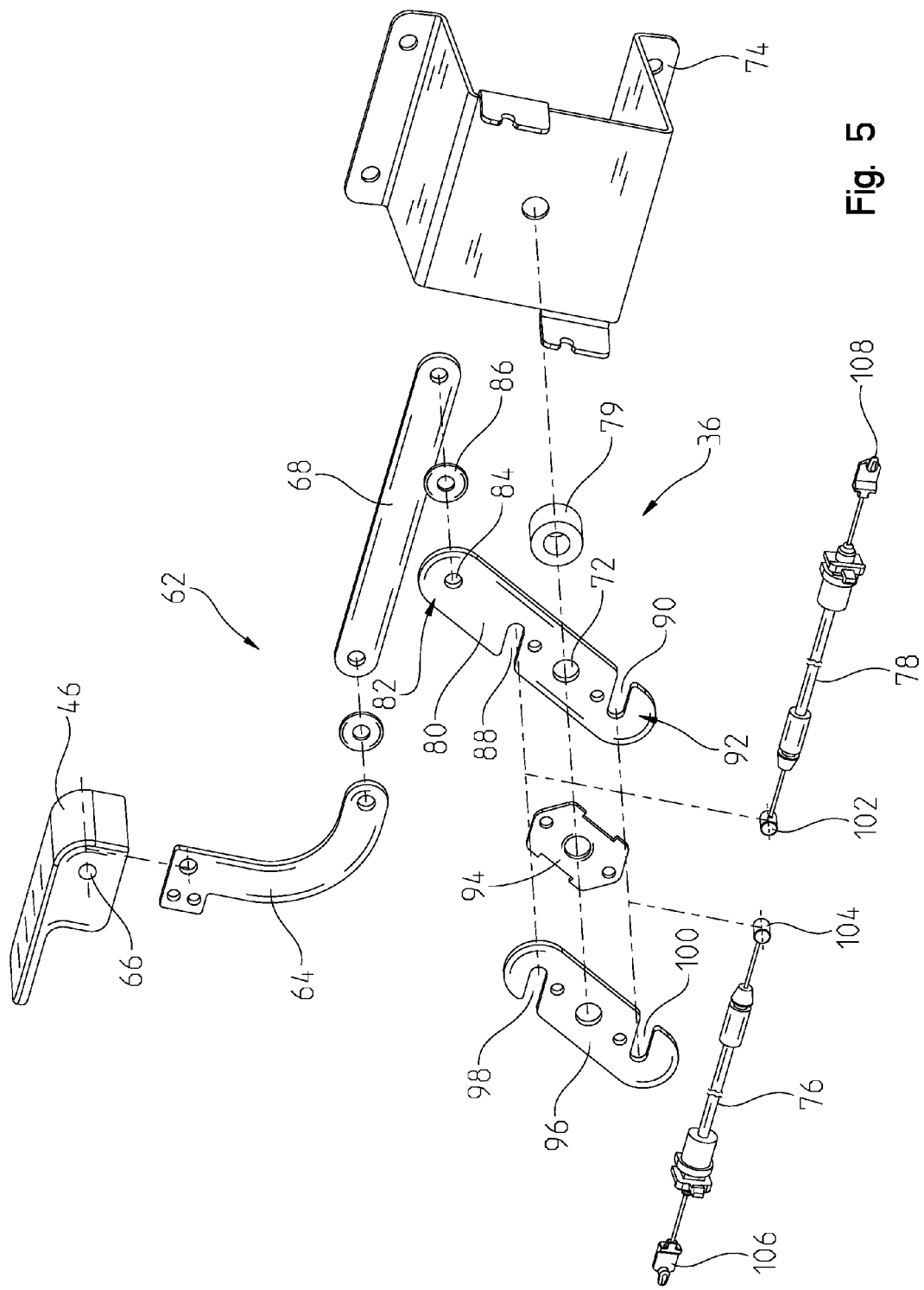
FIG. 5 illustrates a perspective view of the release mechanism of FIG. 4.

As illustrated in FIGS. 4 and 5, the release mechanism 44 includes a lever 62 including an extension 64 pivotably coupled to the handle 46 at a pin 66. A link 68 is movably coupled to the extension 64 at a first end and movably coupled to a latch actuator 70 at a second end. The link 68 moves responsively to movement of the handle 46 to rotate the latch actuator 70 about a pivot 72 which is attached to an actuator support 74 fixedly located in the interior of the tailgate 26. The actuator support 74 is located at a midpoint between the first latch 50 and the second latch 52, each of which is coupled to the latch actuator by a first cable 76 and a second cable 78. In other embodiments, the support 74 is located at other locations.

The latch actuator 70 is rotatably coupled to the support 74 with a washer 79. A connecting bar 80 having a first end 82 is pivotably coupled to the link 68 at an aperture 84. A washer 86 is located between the bar 80 and the link 68. A first slot 88 is located between the pivot 72 and the first end 82 and a second slot 90 is located between the pivot 72 and a second end 92. The latch actuator 70 further includes a spacer 94 disposed between a cable actuator 96 and the connecting bar 80. The cable actuator 96 and the spacer 94 are fixedly connected to the connecting bar 80 such that a slot 98 of the connecting bar 96 is aligned with the slot 88 and a slot 100 of the connecting bar 96 is aligned with the slot 90. The spacer 94 which is disposed between the connecting bar 96 and the cable actuator 96 increases the width of the latch actuator 70 to provide bearing surfaces for terminating ends of each of the cables 76 and 78. A terminating end 102 of the cable 78 is located in the slots 88 and 98. A terminating end 104 is located in the slots 90 and 100.

When the handle 46 is pulled away from the top portion 47, the cable actuator 96 rotates in a counterclockwise direction as illustrated and pulls the cable 76 away from the latch 50, to which it is connected, at an end 106. At the same time, the cable 78 is pulled away from the latch 52, to which it is connected, at an end 108. Each of the latches 50 and 52 are moved to an unlatched position.

Figure 6:
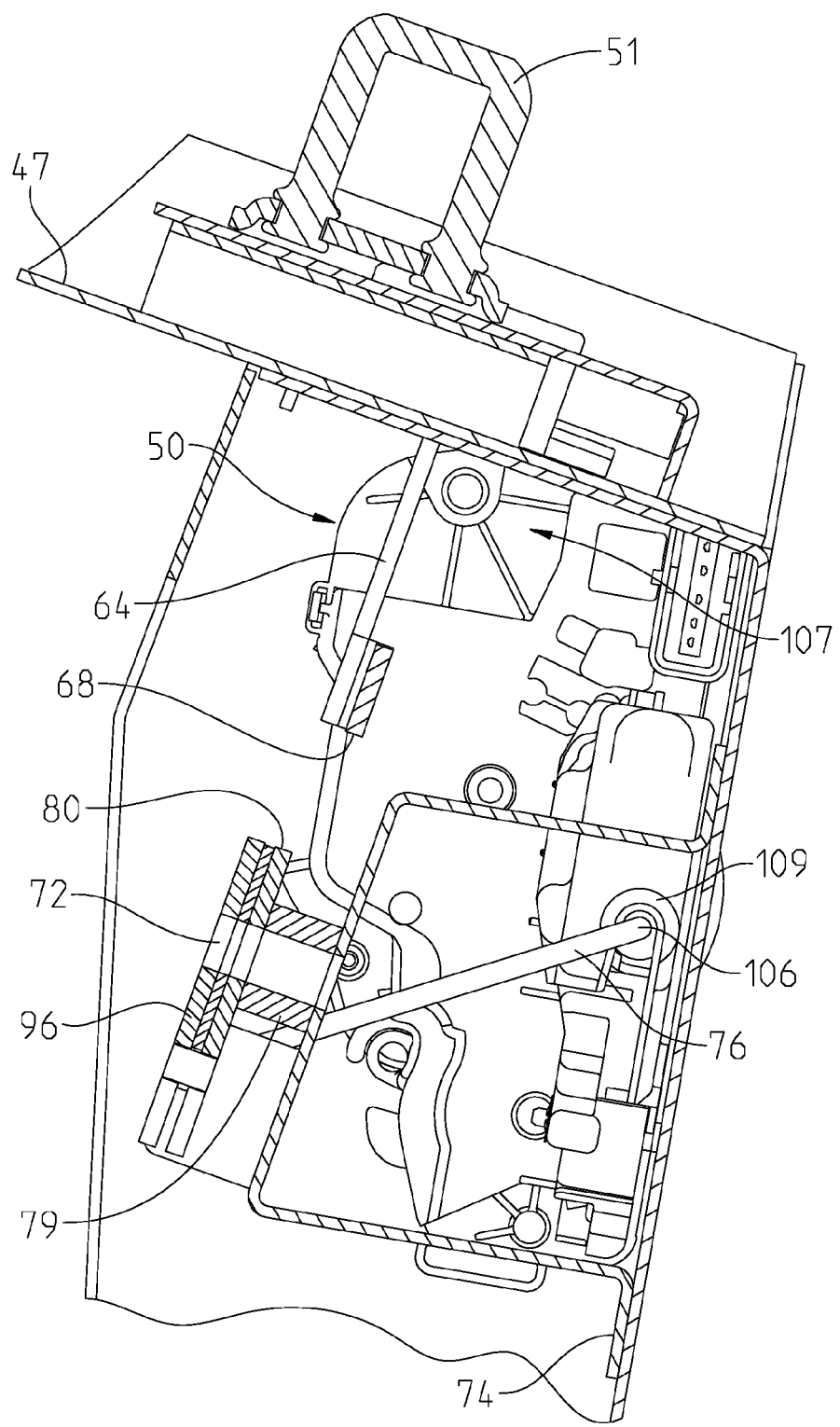
FIG. 6 illustrates an interior view of the tailgate of FIG. 2 taken along lines 6-6.
Figure 7:
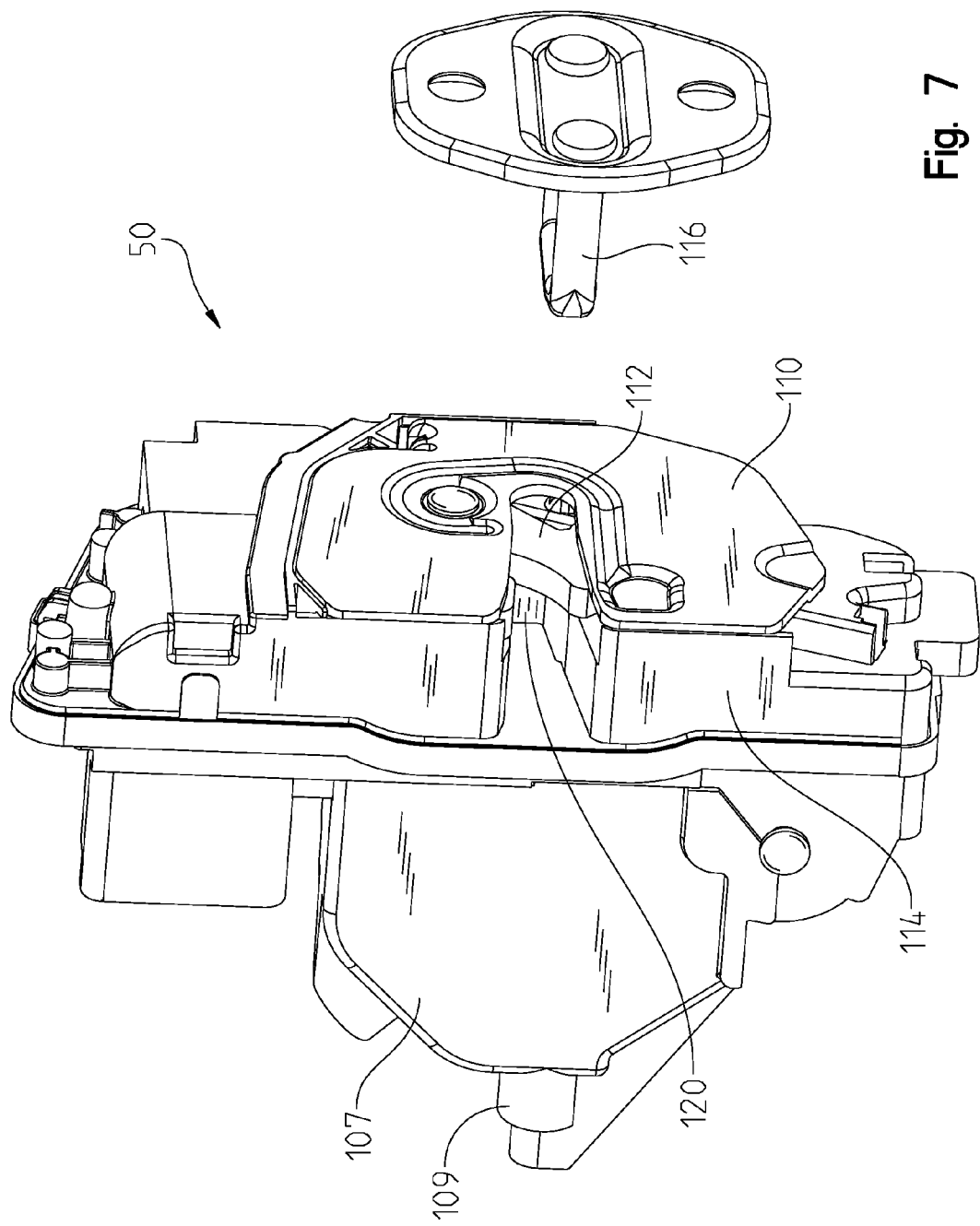
FIG. 7 illustrates a perspective view of a latch assembly and a striker.

FIG. 6 illustrates an interior view of the tailgate of FIG. 2 taken along lines 6-6 and showing a housing 107 of the latch 50. The latch 50 includes a cable input 109 which accepts the end 106 of the cable 76. A force provided by the movement of the handle 46 pulls the cable 76 away from the latch 50 to unlatch the latch 50 as would be understood by one skilled in the art. The latch 52 operates in a similar fashion.

The housing 107 of the latch 50 includes an interface portion 110 which engages a wall of the tailgate 26 to fixedly couple the latch 50 to the tailgate. A catch 112 is located in a catch housing 114 which is exposed to engage a striker 116, such as strikers 54 and 56. As seen in FIG. 3, the catch 112 is accessible through a slot in a sidewall 118 of the tailgate 26. Each of the latches 50 and 52 are similarly located within the tailgate 26 to engage respective strikers 54 and 56. Each of the latches 50 and 52 also include a bumper 120 which contacts the striker 116, when the catch 112 engages the striker. The bumper 120 reduces the amount of noise and rattle which can be present when the catch 112 engages the striker 116, if the bumper 120 were not present. In different embodiments, the bumper is made of a resilient material, including but not limited to, rubber, silicone, nitrile, plastics, and neoprene.

Figure 8:
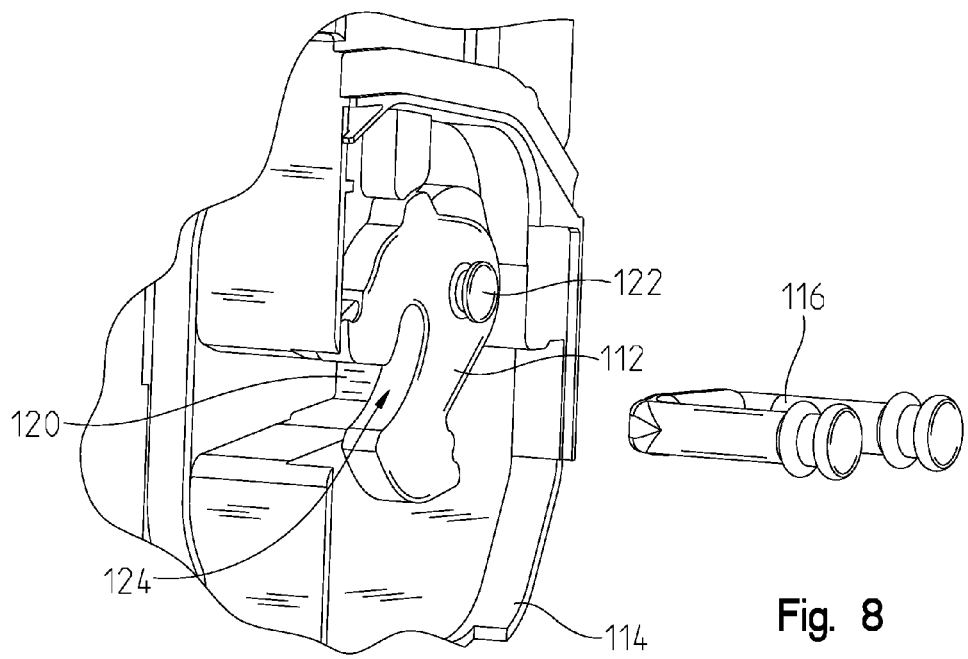
FIG. 8 illustrates a perspective view of a portion of an interior of a latch assembly and a striker spaced from the latch assembly.
Figure 9:
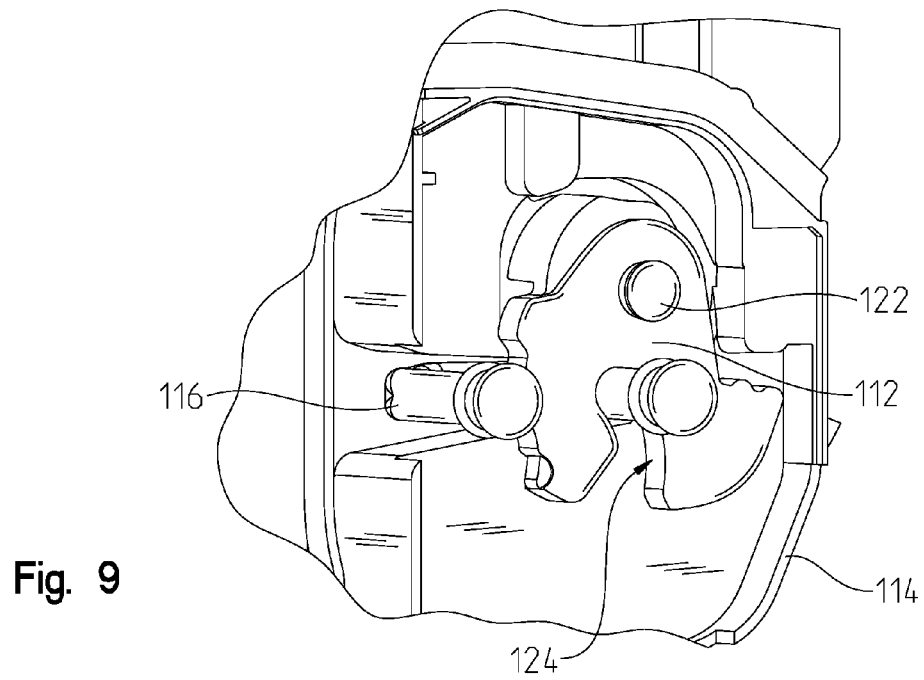
FIG. 9 illustrates a perspective view of the portion of the interior of the latch assembly of FIG. 8 with the striker captured by a catch of the latch assembly.

In FIGS. 8 and 9, the interface portion 110 of the catch housing 114 is removed to illustrate a location of the catch 112 and rotation of the catch about a pivot 122. As seen in FIG. 8, the catch 112 is located in a disengaged position such as would occur in the partially open position of the tailgate 26 of FIG. 3. The catch 112 includes a slot 124 which is adapted to capture and to release a side arm of the U-shaped striker 116.

As the tailgate 26 is closed, each of the slots 124 of the latches engages a respective arm of the appropriate striker. As the tailgate 26 is moved toward the tailgate frame 28, the catch 112 pivots about the pivot 122 in a counterclockwise direction as illustrated, such that the slot 124 of the catch captures the arm of the striker 116. At the same time, as the catch 112 rotates the tailgate 26 is pulled into the striker 116 which contacts the bumper 120 which reduces undesirable noise. As seen in FIG. 9, the slot 124 is pointing in a downward direction to capture the striker 116 and to prevent the tailgate 26 from being opened except in response to movement of the handle 46.

Figure 10:
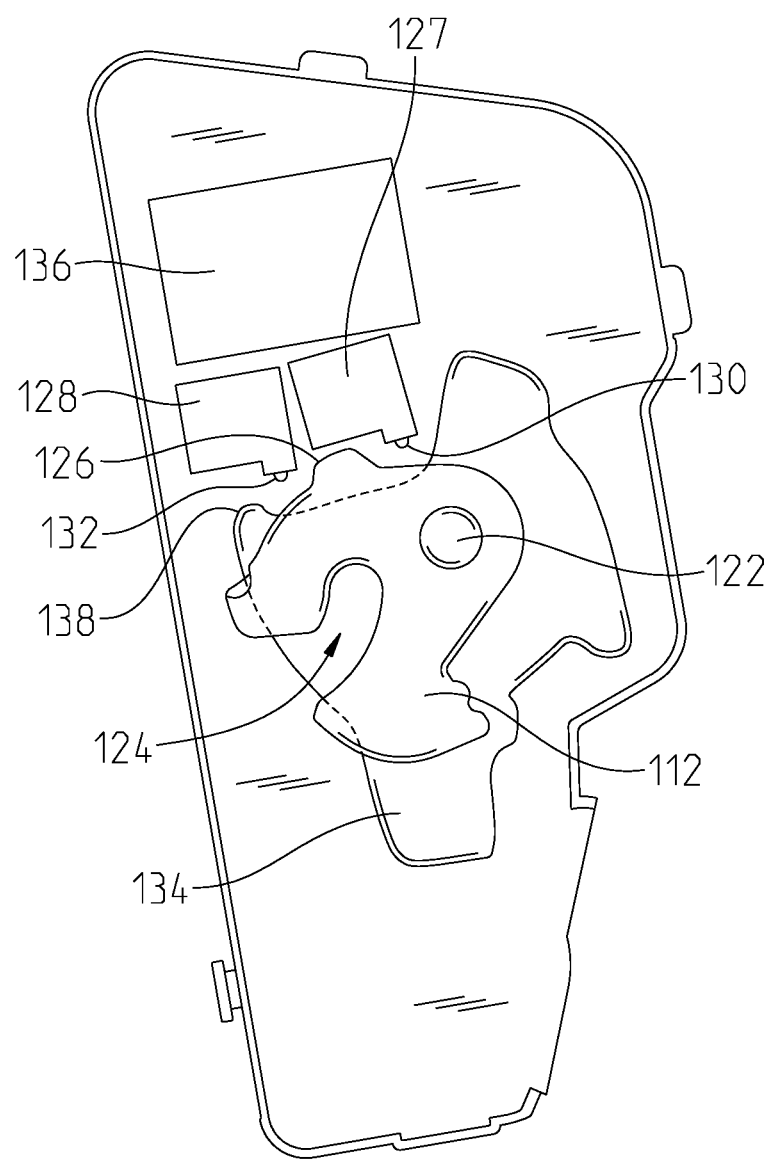
FIG. 10 illustrates an interior view of a latch assembly having a first and a second sensor.

FIG. 10 illustrates a side view one of the latches 50 and 52 with a portion of the housing 114 removed to show the catch 112 located for rotation about the pivot 122 and in the latched or closed position. The catch 122 includes a projection 126 which extends away from adjacent surfaces on either side of the projection 126.

The latch includes a first sensor 127 and a second sensor 128 each of which respectively includes a locator tab 130 and a locator tab 132. When the projection 126 of the catch 112 is disposed adjacently to locator tab 130, the tailgate 26 is not latched but is instead in a partially open position, or ajar. The latch further includes a pawl 134 which pivots about the pivot 122 and which is actuated by a circuit 136 in response to a locking signal provided by a vehicle control unit 140 as further described for FIG. 11. The pawl 134 includes a projection 138 configured to contact the locator tab 132 when the latch is in the locked position. When latched, the circuit determines with an input from the sensor 128 that the latch is in the locked position. The locking pawl 134 is actuated by a driver mechanism as is understood by those skilled in the art.

In one embodiment, each of the locator tabs 130 and 132 are mechanical switches which are actuated when coming into contact with the projection 126 or the projection 138. In another embodiment, each of the locator tabs 130 and 132 are non-contact sensing devices which sense the location of one of the projections 126 and 138. In different embodiments, the non-sensing devices include a magnetic sensor, a Hall-effect sensor, a reflective sensor, or a light sensor. The first sensor and second sensors 126 and 128 provides a status of the sensor which is transmitted to a circuit 136.

FIG. 11 is a simplified schematic diagram of the vehicle 10 and a control system embodying the invention. The vehicle 10 includes an engine 142 which drives a transmission 144. The control unit 140 is electrically coupled to the engine 144 to control various operations of the engine 142, as would be understood by one skilled in the art. The control unit 140 is also electrically coupled to one or more brakes 146, which in different embodiments, controls operations of the brakes or provides a status of the brakes. A user interface 148 is coupled to the control unit 140 and is configured, in different embodiments, to enable a user of the vehicle to provide vehicle commands, to determine various operating characteristics of the vehicle, and to determine current states of various vehicle conditions such as the state of door locks, the liftgate latch, the status of the tailgate 26, and the status of latches 50 and 52. An ignition switch 150 is coupled to the control unit 140 and turns the vehicle on or off. In different embodiments, the ignition switch is a key switch or a pushbutton switch.

A memory 152 is operatively connected to the control unit 140 and provides information storage for the vehicle's status conditions as well as operating programs to operate the vehicle, or any of the vehicle subsystems. A device reader 154 is included in different embodiments to read a security device 156, such as a key fob. The device reader 154 detects and identifies a security device, and if accepted, enables the user to access the vehicle, access vehicle functions, and operate the vehicle.

The control unit 140, in different embodiments, includes a computer, computer system, or programmable device, e.g., multi-user or single-user computers. In other embodiments, the control unit 140 can include one or more processors (e.g. microprocessors), and the associated internal memory including random access memory (RAM) devices comprising the memory storage of the control unit 140, as well as any supplemental levels of memory, e.g., cache memories, non-volatile or backup memories (e.g. programmable or flash memories), and read-only memories, which can be embodied by the memory 152. In addition, the memory can include a memory storage physically located elsewhere from the processing devices and can include any cache memory in a processing device, as well as any storage capacity used as a virtual memory, e.g., as stored on a mass storage device or another computer coupled to controller 140.

Latches 50 and 52 are electrically coupled to the control unit 140 and provide a status of the latch to the control unit 140. The control unit 140, in one embodiment, is configured to control the latches 50 and 52 to be in one of a locked state, a latched state, an unlocked state, and an unlatched state. For instance, a user, through the user interface, sets the status of the latches to being locked or unlocked. The sensors 127 and 128 of FIG. 10 determine the state of the respective latch. In one embodiment, the latch and sensor are combined in a single package as described herein with regard to latches 50 and 52.

In other embodiments, sensors 162 and 164 are provided in addition to the sensors found in the latches and provide a status of the tailgate 26 with respect to the tailgate support frame 28. The status determined by the sensors 162 and 164 in this embodiment, provide a status which includes one or more of a tailgate closed, a tailgate open, and a tailgate partially open.

In still another embodiment, the control unit 140 is configured to monitor the status of the latch, and if the monitored status is one of the latch being unlatched, the control unit 140 prevents the vehicle from being driven away. The monitored status of the tailgate is displayed at the user interface 148 to indicate that the tailgate 26 is closed and which also indicates that the ramp is properly stored.

The user interface 148, in other embodiments, includes a user control feature to power shut and/or to power lock the tailgate from the interior of the vehicle. In still another embodiment, a power ramp system is included which deploys the ramp upon a powered opening of the tailgate. In this embodiment, the tailgate 26 is operatively connected to an electrically powered driver to open and close the tailgate through inputs made by the operator at the user interface 148. The ramp is also power driven for deployment and power driven for returning the ramp to the stowed position.

While exemplary embodiments incorporating the principles of the present invention have been disclosed herein, the present invention is not limited to the disclosed embodiments. Instead, this application is intended to cover any variations, uses, or adaptations of the invention using its general principles. For instance, the present disclosure is not limited to the modification of a purchased OEM vehicle, but can be incorporated into the OEM vehicle when manufactured. Further, this application is intended to cover such departures from the present disclosure as come within known or customary practice in the art to which this invention pertains and which fall within the limits of the appended claims.

What is claimed is:

1. A motor vehicle for transporting a wheelchair-confined passenger, the motor vehicle comprising:
   a body;
   a tailgate frame operatively connected to the body, the tailgate frame including a tailgate support assembly, the tailgate frame defining an opening;
   a ramp assembly coupled to and forming at least a part of the tailgate support assembly, the ramp assembly including an inclined support, wherein the inclined support enables a wheelchaired individual to move from the interior of the vehicle;
   a tailgate rotatably coupled to the tailgate frame with hinges located at a bottom portion of the tailgate, wherein the tailgate includes a closed position adapted to prevent ingress and egress of the wheelchair-confined passenger through the opening and an open position adapted to enable ingress and egress of the wheelchair-confined passenger through the opening;
   a handle located at the tailgate, the handle being accessible to release the tailgate from the closed position for movement to the open position by rotation about the hinges; and
   a latch operatively connected to the handle, wherein the latch includes a latched position configured to latch the tailgate in the closed position and an unlatched position configured to unlatch the tailgate for movement from the closed position to the open position.

2. The motor vehicle of claim 1 further comprising a release mechanism operatively connected to the latch and to the handle, wherein the release mechanism includes a cable coupled to the latch to move the latch from the latched position to the unlatched position.

3. The motor vehicle of claim 2, wherein movement of the handle adjusts a position of the cable to move the latch from the latched position to the unlatched position.

4. The motor vehicle of claim 3 further comprising a striker connected to the tailgate frame, wherein the latch engages the striker in the latched position.

5. The motor vehicle of claim 1, wherein the ramp assembly is configured to support a ramp.

6. The motor vehicle of claim 5 further comprising a user interface operatively connected to the latch, wherein the user interface is configured to set a status of the latch to one of a locked state or an unlocked state in response to a user setting the status.

7. The motor vehicle of claim 6 wherein the user interface is configured to display the status of the latch.

8. A motor vehicle having a body for transporting a wheelchair-confined passenger, the motor vehicle comprising:
   a rear liftgate;
   a tailgate frame operatively connected to the body and disposed adjacently to the rear liftgate, the tailgate frame including a tailgate support assembly, the tailgate frame defining an opening;
   a ramp assembly coupled to and forming at least a part of the tailgate support assembly, the ramp assembly including an inclined support, wherein the inclined support enables a wheelchaired individual to move from the interior of the vehicle;
   a tailgate rotatably coupled to the tailgate frame at the opening with hinges located at a bottom portion of the tailgate, wherein the tailgate includes a closed position and an open position;
   a handle located at the tailgate, the handle being accessible to release the tailgate from the closed position for movement to the open position by rotation about the hinges; and
   a latch operatively connected to the handle, wherein the latch includes a latched position configured to latch the tailgate in the closed position and an unlatched position configured to unlatch the tailgate for movement from the closed position to the open position.

9. The motor vehicle of claim 8 further comprising a striker operatively connected to the tailgate and configured to engage the rear liftgate, wherein the striker in an unengaged condition enables movement of the tailgate to the open position.

10. The motor vehicle of claim 8 wherein the latch includes a locked state, a latched state, and an unlocked state.

11. The motor vehicle of claim 8 further comprising a sensor operatively connected to the tailgate, wherein the sensor provides a status of the tailgate including one of a tailgate closed status, a tailgate open status, or a tailgate partially open status.

12. The motor vehicle of claim 11 further comprising a user interface operatively connected to the sensor, wherein the user interface displays the status of the tailgate provided by the sensor.

13. The motor vehicle of claim 12 further comprising a control unit operatively connected to the sensor, wherein the control unit determines the status of the sensor and prevents the motor vehicle from being driven away if the status is the tailgate open status.

14. A motor vehicle having a body for transporting a wheelchair-confined passenger, the motor vehicle including a rear liftgate including a liftgate latch handle, the motor vehicle comprising:
   a tailgate frame operatively connected to the body and disposed adjacently to the rear liftgate, the tailgate frame including a tailgate support assembly, the tailgate frame including an opening;
   a ramp assembly coupled to and forming at least a part of the tailgate support assembly, the ramp assembly including an inclined support, wherein the inclined support enables a wheelchaired individual to move from the interior of the vehicle;

a tailgate rotatably coupled to the tailgate frame at the opening with hinges located at a bottom portion of the tailgate, wherein the tailgate includes a closed position and an open position;

a handle located at the tailgate, the handle being accessible to release the tailgate from the closed position for movement to the open position by rotation about the hinges; and a tailgate striker operatively connected to the tailgate, wherein the tailgate striker is configured to engage the liftgate latch handle, wherein the tailgate striker in an unlatched condition enables movement of the tailgate from the closed position to the open position.

15. The motor vehicle of claim 14 wherein the tailgate includes a top portion operatively connected to the tailgate striker, and a handle disposed on the top portion.

16. The motor vehicle of claim 15 wherein the tailgate includes a sidewall extending from the top portion to define an interior of the tailgate with the top portion, and further comprising a latch disposed in the interior of the tailgate, wherein the handle is operatively connected to the latch to unlatch the tailgate from the closed position.

17. The motor vehicle of claim 16 further comprising a tailgate striker operatively connected to the tailgate frame, wherein the latch is configured to engage the tailgate striker in the closed position of the tailgate.

18. The motor vehicle of claim 17 wherein the latch includes a latch sensor configured to determine a latch status of the latch, wherein the latch status includes one of a locked state or an unlocked state.

19. The motor vehicle of claim 18 further comprising a tailgate sensor operatively connected to the tailgate, wherein the tailgate sensor provide a status of the tailgate including one of a tailgate closed status, a tailgate open status, or a tailgate partially open status.

\* \* \* \* \*